(12) United States Patent
Huang et al.

(10) Patent No.: US 9,204,483 B1
(45) Date of Patent: *Dec. 1, 2015

(54) METHODS FOR OBTAINING A MOBILE INTERNET PROTOCOL ADDRESS

(75) Inventors: Feng Huang, Herndon, VA (US); Lei Zhu, Overland Park, KS (US); David S. McGinniss, Aurora, IL (US); Mohammad Hassan Partovi, Potomac, MD (US)

(73) Assignee: Clearview IP Holdings LLC, Bellevue, WA (US)

( * ) Notice: Subject to any disclaimer, the term of this patent is extended or adjusted under 35 U.S.C. 154(b) by 305 days.

This patent is subject to a terminal disclaimer.

(21) Appl. No.: 13/605,798

(22) Filed: Sep. 6, 2012

Related U.S. Application Data

(63) Continuation of application No. 12/265,000, filed on Nov. 5, 2008, now Pat. No. 8,279,872.

(60) Provisional application No. 61/048,081, filed on Apr. 25, 2008.

(51) Int. Cl.
*H04W 80/04* (2009.01)
*H04L 12/28* (2006.01)

(52) U.S. Cl.
CPC ............... *H04W 80/04* (2013.01); *H04L 12/28* (2013.01)

(58) Field of Classification Search
USPC .................................. 370/328, 389, 401, 410
See application file for complete search history.

(56) References Cited

U.S. PATENT DOCUMENTS

| | | | |
|---|---|---|---|
| 7,366,509 B2 | 4/2008 | Akgun et al. | |
| 7,675,917 B2 | 3/2010 | Ju et al. | |
| 7,805,754 B2 | 9/2010 | Song et al. | |
| 7,808,942 B2 | 10/2010 | Bui et al. | |
| 7,808,970 B2 | 10/2010 | Narayanan et al. | |
| 7,843,881 B2 | 11/2010 | Kim et al. | |
| 7,860,067 B2 | 12/2010 | Na et al. | |
| 7,934,094 B2 | 4/2011 | Oyama | |
| 8,005,056 B2 | 8/2011 | Park | |
| 8,036,709 B2 | 10/2011 | Kim et al. | |
| 8,078,872 B2 | 12/2011 | Zhao | |
| 8,279,872 B1* | 10/2012 | Huang et al. | 370/392 |
| 2004/0193712 A1 | 9/2004 | Benenati et al. | |
| 2006/0073840 A1 | 4/2006 | Akgun et al. | |
| 2007/0275716 A1* | 11/2007 | Lee et al. | 455/433 |
| 2008/0045214 A1 | 2/2008 | Wen et al. | |

* cited by examiner

*Primary Examiner* — Andrew Lee

(57) ABSTRACT

In various embodiments, methods and systems are provided for acquiring a mobile internet protocol address in a communication network. In an embodiment, a mobile network internet node key is sent to a service node. A mobile network internet node sends a mobile internet protocol access request message to an authentication node. The authentication node can then receive the mobile network internet node key transferred from the service node. In response to receiving a mobile internet protocol access accept message at the mobile network internet node transferred from the authentication node where the mobile internet protocol access accept message comprises the mobile network internet node key, the mobile internet protocol address is assigned at the mobile network internet node to a mobile station associated with a user identifier.

10 Claims, 5 Drawing Sheets

METHODS FOR OBTAINING A MOBILE INTERNET PROTOCOL ADDRESS

This application is a continuation of prior application Ser. No. 12/265,000, currently in condition for allowance, filed Nov. 5, 2008, which is hereby incorporated by reference in its entirety.

REFERENCE

This patent application claims the benefit of U.S. provisional patent application 61/048,081; entitled METHOD AND SYSTEM FOR OBTAINING A MOBILE INTERNET PROTOCOL ADDRESS; filed on Apr. 25, 2008; and hereby incorporated by reference into this patent application.

TECHNICAL BACKGROUND

Wireless communication services are a popular choice for accessing a variety of communication networks. To facilitate the provision of wireless services, many standards bodies put forward a variety of wireless technologies. For example, the Institute of Electrical and Electronics Engineers (IEEE) has promulgated a number of wireless standards including the 802.11 (WiFi) standards and the 802.16 (WiMAX) standards. Likewise, the International Telecommunication Union (ITU) has also offered standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive communication solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Wireless communication services offer certain advantages over wired communication for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. Mobility also provides challenges for providing access to existing public and proprietary networks including the ability to ensure that a wireless device maintains connectivity while operating in a mobile environment.

OVERVIEW

In various embodiments, methods and systems are provided for acquiring a mobile internet protocol address in a communication network. In an embodiment, a mobile network internet node key is sent to a service node. A mobile network internet node sends a mobile internet protocol access request message to an authentication node. The authentication node can then receive the mobile network internet node key transferred from the service node. In response to receiving a mobile internet protocol access accept message at the mobile network internet node transferred from the authentication node where the mobile internet protocol access accept message comprises the mobile network internet node key, the mobile internet protocol address is assigned at the mobile network internet node to a mobile station associated with a user identifier.

DETAILED DESCRIPTION

Wireless communication networks are global in nature and require a variety of network elements to facilitate communication for its users. At times, assigning a mobile internet protocol (MIP) address to a mobile station becomes problematic when multiple network elements are involved to authenticate wireless devices on a communication network. Thus, it becomes important for the communication network to have the ability to effectively recognize the proper network elements to ensure that data is properly transferred among the network elements to the wireless device.

Figure 1:
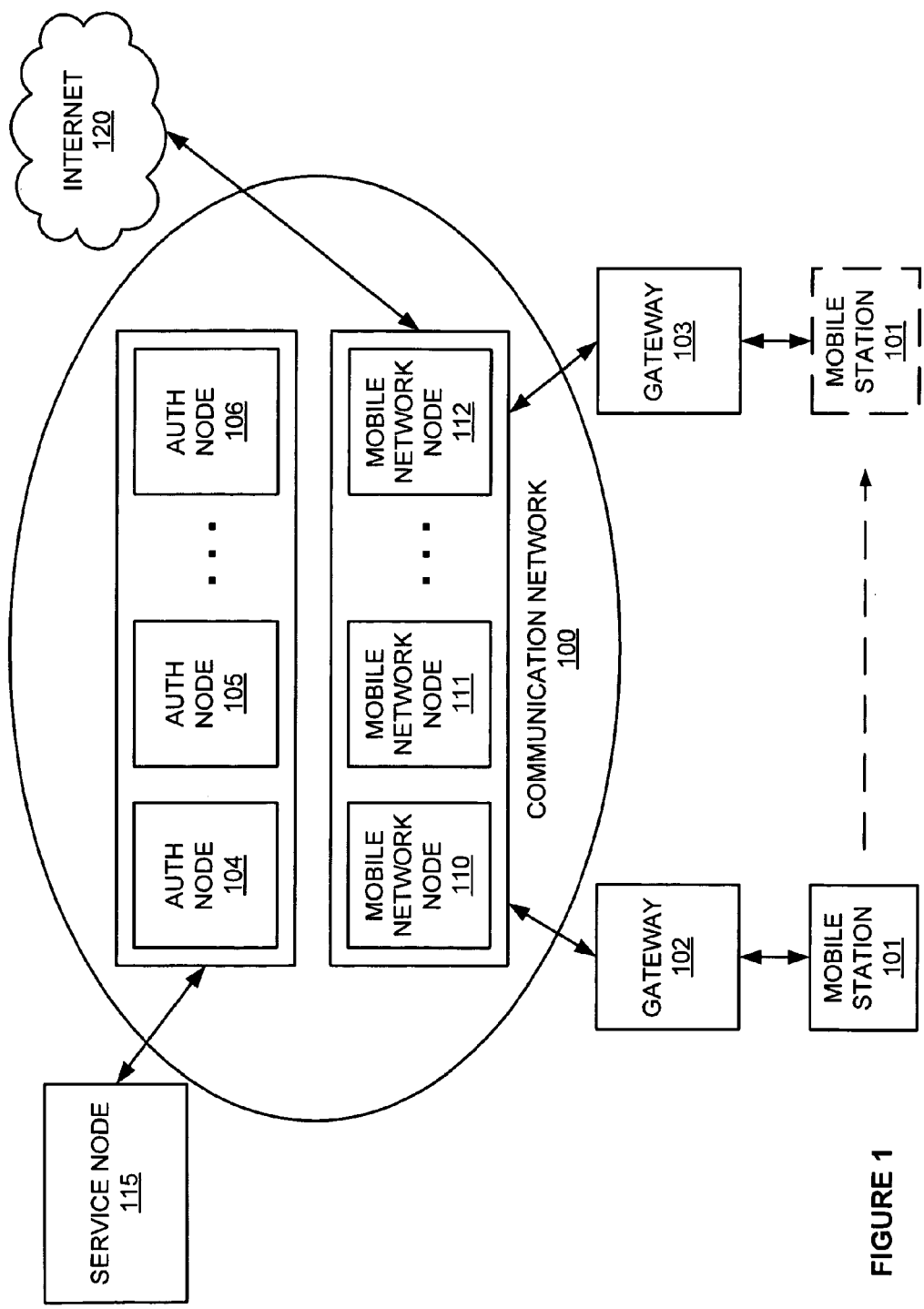
FIG. 1 is a block diagram illustrating a communication system for assigning a mobile internet protocol address to a mobile station.

Referring to FIG. 1, a block diagram is provided illustrating an exemplary embodiment for assigning a mobile internet protocol (MIP) address to a mobile station. FIG. 1 comprises communication network 100, mobile station 101, gateway 102, gateway 103, authentication node 104, authentication node 105, authentication node 106, mobile network internet node 110, mobile network internet node 111, mobile network internet node 112, service node 115 and internet protocol network (Internet) 120.

Communication network 100 comprises authentication nodes 104-106 and mobile network internet nodes 110-112. Mobile station 101 exchanges information with gateway 102 or gateway 103. Gateway 102 and gateway 103 may exchange information with mobile network internet nodes 110-112. Gateway 102 and gateway 103 may also exchange information with authentication nodes 104-106. Service node 115 may exchange information with authentication nodes 104-106. Internet 120 may exchange information with mobile network internet nodes 110-112.

Communication network 100 may comprise any wireless network that provides communication connectivity for mobile station 101 to communication with other users. Wireless network protocols that may be utilized by communication network 100 may include code division multiple access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), General Packet Radio Services (GPRS), Worldwide Interoperability for Microwave Access (WiMAX) and the like.

Mobile station 101 may be any device that has wireless communication connectivity that may be readily moved from one location to another. Mobile station 101 could include telephones, smartphones, mobile phones, cellular phones, personal digital assistants (PDAs), personal communicators, handheld game consoles, personal computers (PCs), Ultra-Mobile personal computers (UMPCs), handheld televisions and any other consumer appliance with wireless communication capabilities. Referring to FIG. 1, mobile station 101's ability to move from one location to another is illustrated by the dotted lines.

Gateway 102 provides communication connectivity and acts as an aggregator of traffic or interworking device between one or more base stations or base station controllers (not shown) and communication network 100. Examples of gateway 102 may include an access service network gateway (ASN-GW), wireless local access network access gateway (WAG), packet data gateway (PDG), serving GPRS support node (SGSN), mobile switching center (MSC) and packet data serving node (PDSN).

Authentication nodes 104-106 provide the necessary authentication functions for communication network 100 to allow mobile station 101 to gain access to communication network 100. Communication network may utilize more than one authentication node as illustrated in FIG. 1. Further, mobile station 101 may exchange information with any one of authentication nodes 104-106. Authentication nodes 104-106 may comprise one or more authentication, authorization and accounting (AAA) servers or computing platforms.

Mobile network internet nodes 110-112 may comprise any network router that provides communication connectivity between communication network 100 and Internet 120. Mobile station 101 may exchange information with any one of mobile network internet nodes 110-112 to provide connectivity between mobile station 101 and Internet 120. Examples of mobile network internet nodes 110-112 may include one or more home agents (HAs), gateway GPRS support node (GGSN) and the like.

Service node 115 would include any computing platform or platforms that would provide certain network management functions for communication network 100. Examples of network management functions comprise controlling, planning, allocating, deploying, coordinating, and monitoring the resources of a network, including performing functions such as initial network planning, frequency allocation, predetermined traffic routing to support load balancing, cryptographic key distribution authorization, configuration management, fault management, security management, performance management, bandwidth management, and accounting management. Elements that may perform management functions comprise authentication servers, provisioning servers, security servers, billing platforms and any other platform that enables a network provider to manage its network. Service node 115 may also maintain subscriber information associated with users that have permission to utilize communication network 100 and gateways 102-103.

Internet 120 is any collection of interconnected computing networks that provide communication connectivity between users. Internet 120 may be publicly accessible or may be a collection of private or proprietary computing networks.

In operation, one of authentication nodes 104-106 is associated with one or more of mobile network internet nodes 110-112 based upon a policy configurable by the operator. For this embodiment, authentication node 105 is associated with mobile network internet node 110. Mobile network internet node 110 obtains a mobile network internet node key from authentication node 105 that utilizes service node 115. Then mobile network internet node 110 assigns a mobile internet protocol address to a mobile station associated with the user identifier in response to obtaining the mobile network internet node key.

Figure 2:
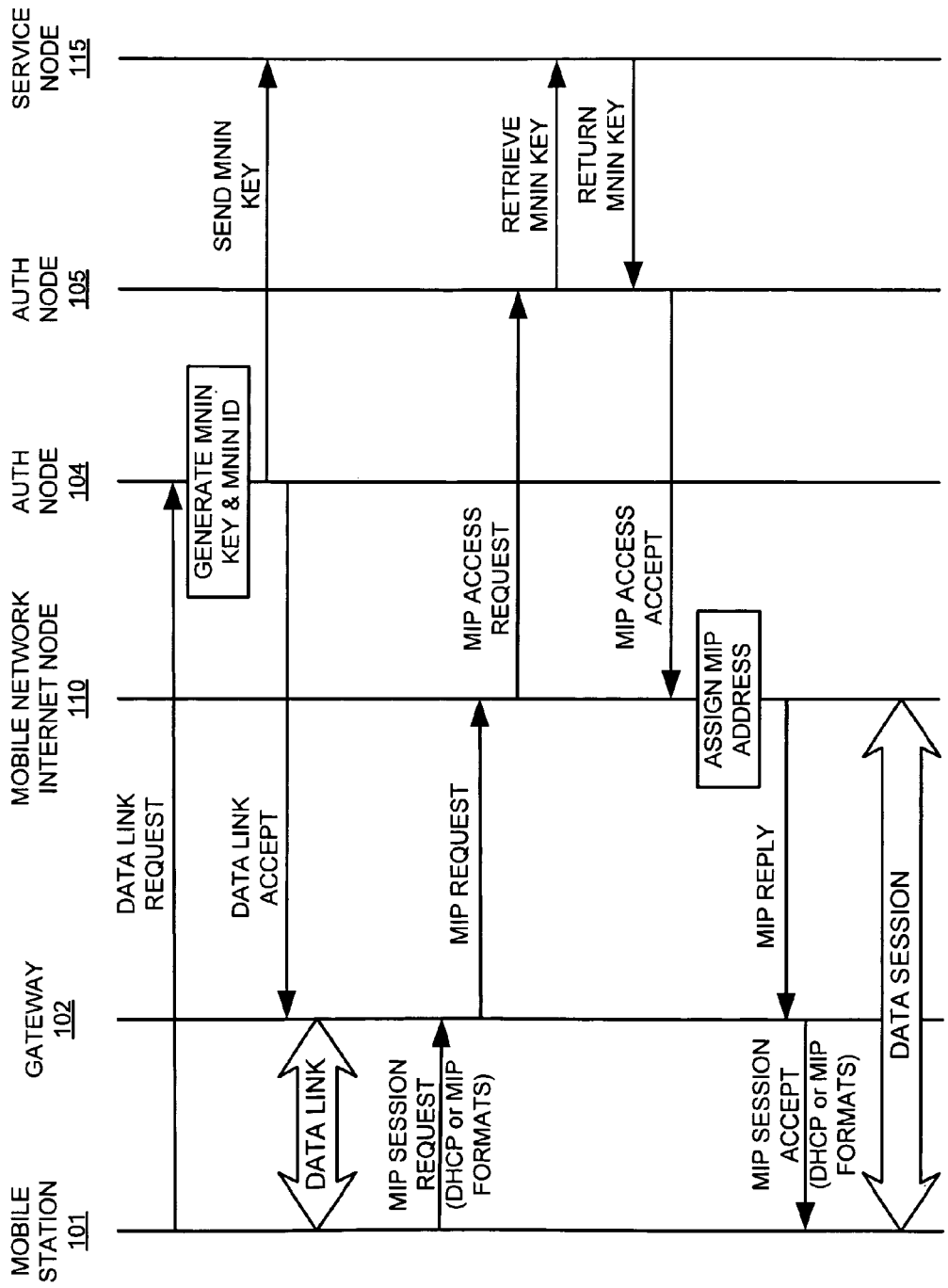
FIG. 2 is a flow diagram illustrating the operation of assigning a mobile internet protocol address to a mobile station.

FIG. 2 illustrates a flow diagram for utilizing a method for obtaining a mobile internet protocol (MIP) address in a wireless communication network. A MIP address may include any internet protocol (IP) address that is associated with mobile station 101 where mobile station 101 has the ability to move and exchange information with one network element at one location and then with another network element when the mobile device is at another location while maintaining the same mobile IP address (as illustrated in FIG. 1 by the dotted lines). Network elements that may exchange information with mobile station 101 comprise a base station transceiver (BTS), base station controller (BSC), base station (BS), Node B, enhanced Node B (eNB), mobile switching center (MSC), access service node gateway (ASN-GW), access gateway (aGW), home agent (HA), authentication, authorization and accounting (AAA) server and the like.

A data link request message is received at authentication node 104 transferred from mobile station 101. The data link request message comprises a user identifier and the authentication node comprises an authentication node identifier. A user identifier may include any identifier associating a user to mobile station 101. Examples of user identifiers may include a user name and password, network access identifier (NAI), media access control (MAC) address, digital certificates, tokens, phone numbers and any other similar identifier. An authentication node identifier may comprise authentication node 104's internet protocol address or any other unique identifier.

Authentication node 104 generates and stores at authentication node 104 a mobile network internet node (MNIN) key and a mobile network internet node identifier (MNIN ID) using the user identifier. A mobile network internet node key may be any dynamically created security key that would allow communication network 100 to authenticate users and any associated message flows and connections utilized by mobile station 101 to have access to communication network 100. A mobile network internet node identifier may comprise mobile network internet node 110's internet protocol address or any other unique identifier.

Authentication node 104 sends the mobile network internet node key to service node 115 for later retrieval by any authentication node. The messaging for sending the mobile network internet node key may include any number of network parameters including the user identifier, the mobile network internet node key itself and other parameters.

Authentication node 104 sends a data link accept message to gateway 102 where the data link accepted message comprises the mobile network internet node key and the mobile network internet node identifier. Gateway 102 then establishes a data link at the gateway node for use by the mobile station. The data link may comprise any layer 2 or MAC layer communication link.

The steps used to establish the data link may utilize any authentication framework or protocol. One example of such a framework is an extensible authentication protocol (EAP). Those skilled in the art would recognize many other protocols could be used when authenticating connections in wireless networks.

Continuing with FIG. 2, a mobile internet protocol (MIP) session request message is received utilizing the data link at gateway 102 transferred from mobile station 101. The MIP session request message may include multiple messages using a variety of different protocols. Such protocols would include any protocol that allows mobile station 101 to obtain and transfer various parameters necessary to operate on communication network 100. Dynamic Host Configuration Protocol (DHCP) is one example of a protocol used when gateway 102 generates the MIP session request message on behalf of mobile station 101. This protocol may be referred to as a proxy mobile internet protocol (PMIP). Another example of a protocol that may be utilized is a client mobile internet protocol (CMIP) where mobile station 101 generates and utilizes a standardized MIP message format.

Gateway 102 then sends a mobile internet protocol request message to mobile network internet node 110 where the mobile internet protocol (MIP) request message would include any number of parameters for use by mobile network internet node 110. For example, the MIP request message would include the user identifier, a value associated with the mobile network internet node key and other network parameters.

Mobile network internet node 110 sends a mobile internet protocol (MIP) access request message to authentication node 105, an authentication node that is associated with mobile network internet node 110. The MIP access request message would include the user identifier, a value associated with the mobile network internet node key and other network parameters.

Authentication node 105 then retrieves the mobile network internet node key from service node 115. As noted above, the mobile network internet node key is associated with the user identifier.

After obtaining the mobile network internet node key and in response to the MIP access request message, mobile network internet node 110 receives a mobile internet protocol (MIP) access accept message transferred from authentication node 105 where the MIP access accept message includes the mobile network internet node key among other parameters. When the mobile network internet node key is returned to mobile network internet node 110, mobile network internet node 110 assigns mobile station 101 a MIP address.

The MIP access request and MIP access accept messages may be in any form that allows mobile network internet node 110 and authentication node 105 to exchange information with one another. Examples of such formats and protocols would include Remote Authentication Dial In User Service (RADIUS) and Diameter networking protocols.

Gateway 102 then receives a mobile internet protocol (MIP) reply message transferred from mobile network internet node 110 where MIP reply message includes the MIP address among other parameters. Parameters may include any data that could be utilized by gateway 102 to perform its intended function.

Gateway 102 sends a mobile internet protocol (MIP) session accept message to mobile station 101 where the MIP session accept message includes the MIP address among other parameters. As with the MIP session request message, the MIP session accept message may include multiple messages using a variety of different protocols. Such protocols would include any protocol that allows mobile station 101 to obtain and transfer various parameters necessary to operate on communication network 100. DHCP is one example of a protocol that could be utilized when running a PMIP-based network. Standardized MIP message formats may be used when running a CMIP-based network. Mobile station 101 then has the ability to establish a data session with Internet 120 through mobile network internet node 110 upon receipt of the MIP address.

Figure 3:
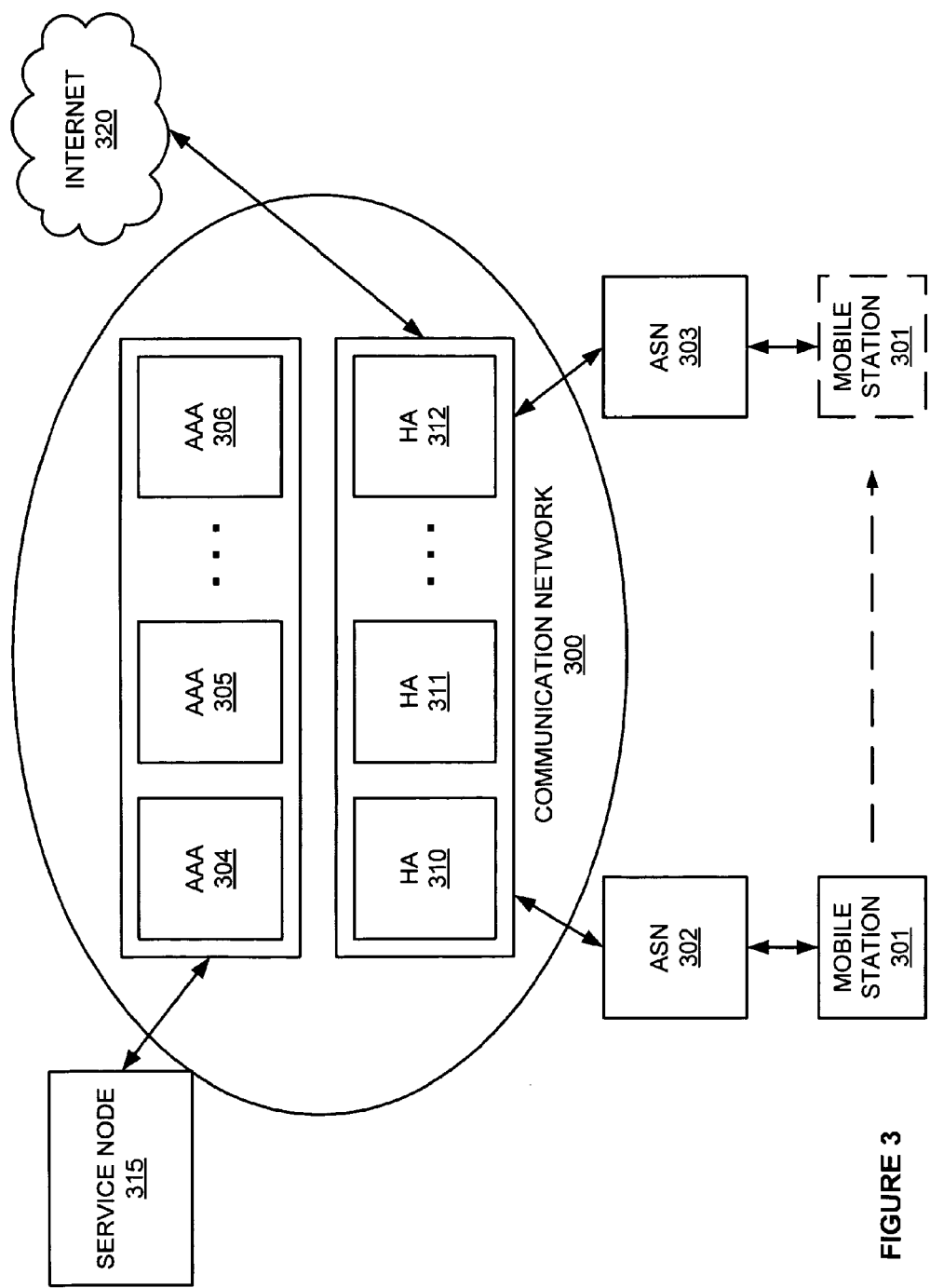
FIG. 3 is a block diagram illustrating a WiMAX communication system for assigning a mobile internet protocol address to a mobile station.

Referring now to FIG. 3, a block diagram is provided illustrating an exemplary embodiment for assigning a mobile internet protocol (MIP) address to a mobile station. FIG. 3 comprises communication network 300, mobile station 301, access services network gateway (ASN-GW) 302, ASN-GW 303, authentication, authorization, and accounting (AAA) node 304, AAA node 305, AAA node 306, mobile internet protocol home agent (HA) node 310, HA node 311, HA node 312, service node 315 and internet protocol network (Internet) 320.

Communication network 300 comprises AAA nodes 304-306 and HA nodes 310-312. Mobile station 301 exchanges information with ASN-GW 302 or ASN-GW 303. ASN-GW 302 and ASN-GW 303 may exchange information with HA nodes 310-312. ASN-GW 302 and ASN-GW 303 may also exchange information with AAA nodes 304-306. Service node 115 may exchange information with AAA nodes 304-306. Internet 320 may exchange information with HA nodes 310-312.

Mobile station 301 may be any device that has wireless WiMAX communication connectivity that may be readily moved from one location to another. Mobile station 301 could include telephones, smartphones, mobile phones, cellular phones, personal digital assistants (PDAs), personal communicators, handheld game consoles, personal computers (PCs), Ultra-Mobile personal computers (UMPCs), handheld televisions and any other consumer appliance with wireless communication capabilities. Referring to FIG. 3, mobile station 301's ability to move from one location to another is illustrated by the dotted lines.

ASN-GW 302 and ASN-GW 303 are part of an access service network that provide communication connectivity and acts as an aggregator of traffic or interworking device between one or more base stations or base station controllers (not shown) and communication network 300. Additionally, ASN-GWs 302 and 303 may also comprise other functions including proxy mobile internet protocol (PMIP), foreign agent (FA), and other related functions.

AAA nodes 304-306 provide the necessary authentication, authorization and accounting functions for communication network 300 to allow mobile station 301 to gain access to communication network 300. Communication network 300 may utilize more than one AAA node as illustrated in FIG. 3. Further, mobile station 301 may exchange information with any one of AAA nodes 304-306.

HA nodes 310-312 may comprise any network router that provides communication connectivity between communication network 300 and Internet 320. Mobile station 301 may exchange information with any one of HA nodes 310-312 to provide connectivity between mobile station 301 and Internet 320.

Service node 315 would include any computing platform or platforms that would provide certain network management functions for communication network 300. Examples of network management functions comprise controlling, planning, allocating, deploying, coordinating, and monitoring the resources of a network, including performing functions such as initial network planning, frequency allocation, predetermined traffic routing to support load balancing, cryptographic key distribution authorization, configuration management, fault management, security management, performance management, bandwidth management, and accounting management. Elements that may perform management functions comprise authentication servers, provisioning servers, security servers, billing platforms and any other platform that enables a network provider to manage its network. Service node 315 may also maintain subscriber information associated with users that have permission to utilize communication network 300 and ASN-GWs 302 and 303.

Internet 320 is any collection of interconnected computing networks that provide communication connectivity between users. Internet 320 may be publicly accessible or may be a collection of private or proprietary computing networks.

In operation, one of AAA nodes 304-306 is associated with one or more of HA nodes 310-312 based upon a policy configurable by the operator. For this embodiment, AAA node 305 is associated with HA node 310. HA node 310 obtains a mobile network internet node key from AAA node 305 that utilizes service node 315. Then HA node 310 assigns a mobile internet protocol address to a mobile station associated with the user identifier in response to obtaining the mobile network internet node key.

Figure 4:
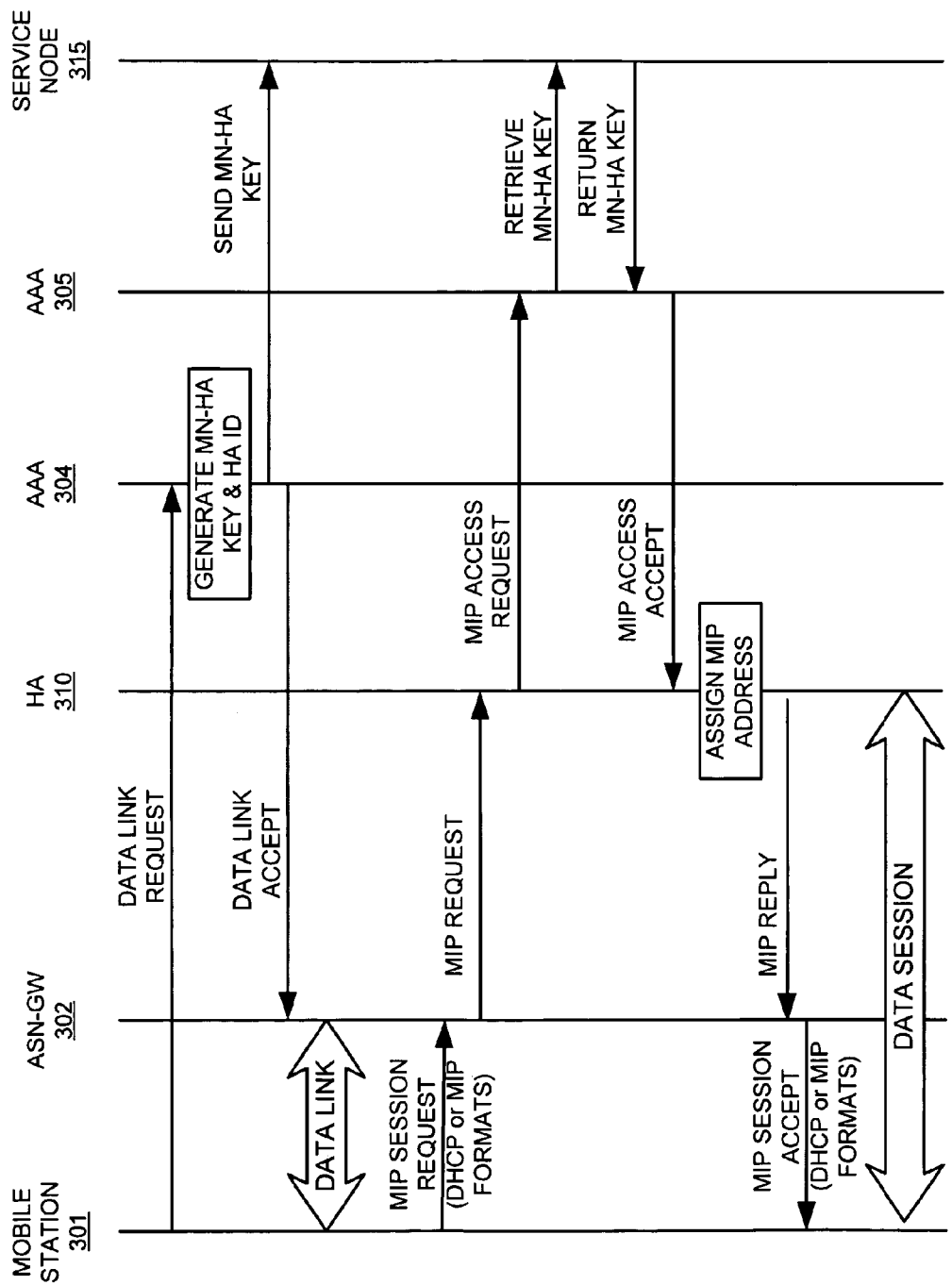
FIG. 4 is a flow diagram illustrating the operation of assigning a mobile internet protocol address to a mobile station in a WiMAX network.

FIG. 4 illustrates a flow diagram for utilizing a method for obtaining a mobile internet protocol (MIP) address in a wireless communication network. A MIP address may include any internet protocol (IP) address that is associated with mobile station 301 where mobile station 301 has the ability to move and exchange information with one network element at one location and then with another network element when the mobile device is at another location while maintaining the same mobile IP address (as illustrated in FIG. 3 by the dotted lines). Network elements that may exchange information with mobile station 301 comprise a base station (BS), access service node gateway, home agent, authentication, authorization and accounting server and the like.

A data link request message is received at AAA node 304 transferred from mobile station 301. The data link request message comprises a user identifier and the AAA node 304 comprises an AAA node identifier. A user identifier may include any identifier associating a user to mobile station 301. Examples of user identifiers may include a user name and password, network access identifier (NAI), media access control (MAC) address, digital certificates, tokens, phone numbers and any other similar identifier. An AAA node identifier may comprise AAA node 304's internet protocol address or any other unique identifier.

AAA node 304 generates and stores a mobile network home agent (MN-HA) key and a home agent node identifier (HA ID) using the user identifier. A MN-HA key may be any dynamically created security key that would allow communication network 300 to authenticate users and any associated message flows and connections utilized by mobile station 301 to have access to communication network 300. A HA ID may comprise HA node 310's internet protocol address or any other unique identifier.

AAA node 304 sends the MN-HA key to service node 315 for later retrieval by any AAA other than AAA node 304. The messaging for sending the MN-HA key may include any number of network parameters including the user identifier, the mobile network internet node key itself and other parameters.

AAA node 304 sends a data link accept message to ASN-GW 302 where the data link accept message comprises the MN-HA key and the HA ID. ASN-GW 302 then establishes a data link at ASN-GW 302 for use by mobile station 301. The data link may comprise any layer 2 or MAC layer communication link.

The steps used to establish the data link may utilize any authentication framework or protocol. One example of such a framework is an extensible authentication protocol (EAP). Those skilled in the art would recognize many other protocols could be used when authenticating connections in wireless networks.

Continuing with FIG. 4, a mobile internet protocol (MIP) session request message is received utilizing the data link at ASN-GW 302 transferred from mobile station 301. The MIP session request message may include multiple messages using a variety of different protocols. Such protocols would include any protocol that allows mobile station 301 to obtain and transfer various parameters necessary to operate on communication network 300. DHCP is one example of a protocol that could be utilized when running a PMIP-based network. MIP message formats may be used when messages are generated by mobile station 101 using a CMIP-based protocol.

ASN-GW 302 then sends a mobile internet protocol request message to HA node 310 where the mobile internet protocol (MIP) request message would include any number of other parameters for use by HA node 310. For example, the MIP request message would include the user identifier, a value associated with the MN-HA key and other network parameters.

HA node 310 sends a mobile internet protocol (MIP) access request message to AAA node 305, an AAA that is associated with HA 310. The MIP access request message would include the user identifier, a value associated with the MN-HA key and other network parameters.

AAA node 305 then retrieves the MN-HA key from service node 315. As noted above, the mobile network internet node key is associated with the user identifier. If HA 310 is associated with AAA 304, then AAA 304 would not need to retrieve the MN-HA key from service node 315 because the MN-HA key was already stored on AAA 304 as described above.

After obtaining the MN-HA key and in response to the MIP access request message, HA node 310 receives a mobile internet protocol (MIP) access accept message transferred from AAA node 305 where the MIP access accept message includes the MN-HA key among other parameters. When the MN-HA key is returned to HA node 310, HA node 310 assigns mobile station 301 a MIP address.

The MIP access request and MIP access accept messages may be in any form that allows HA node 310 and AAA node 305 to exchange information with one another. Examples of such formats and protocols would include RADIUS and Diameter networking protocols.

ASN-GW 302 then receives a mobile internet protocol (MIP) reply message transferred from HA node 310 where MIP reply message includes the MIP address among other parameters. Parameters may include any data that could be utilized by ASN-GW 302 to perform its intended functions.

ASN-GW 302 sends a mobile internet protocol (MIP) session accept message to mobile station 301 where the MIP session accept message includes the MIP address among other parameters. As with the MIP session request message, the MIP session accept message may include multiple messages using a variety of different protocols. Such protocols would include any protocol that allows mobile station 301 to obtain and transfer various parameters necessary to operate on communication network 300. DHCP is one example of a protocol that could be utilized when running a PMIP-based network. MIP message formats may be used when running a CMIP-based network. Mobile station 301 then has the ability to establish a data session with Internet 320 through HA node 310 upon receipt of the MIP address.

Figure 5:
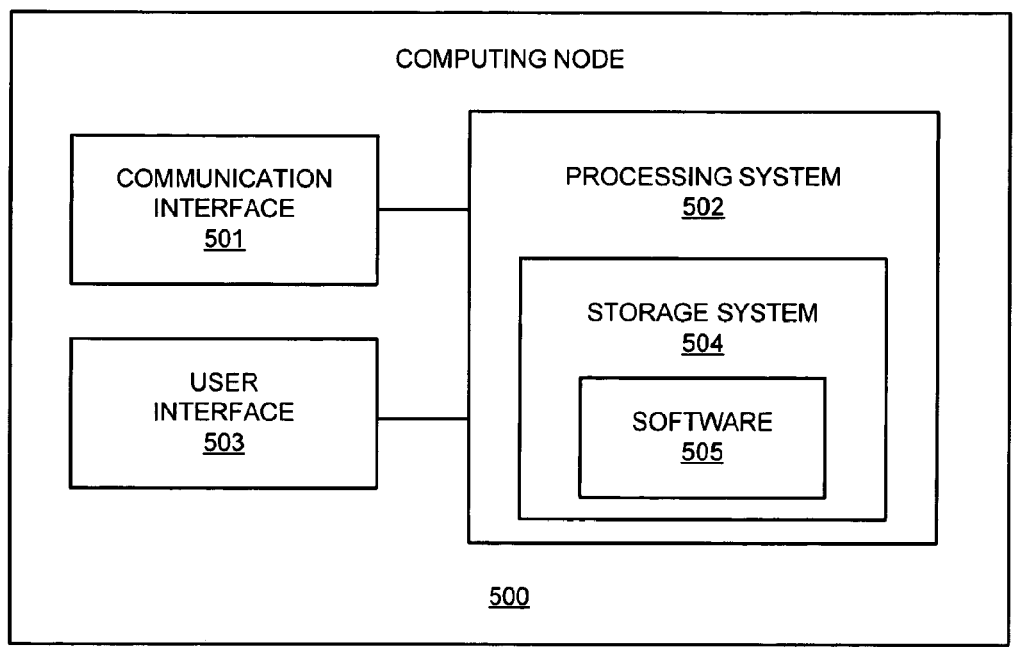
FIG. 5 is a block diagram illustrating a computing system.

FIG. 5 is a block diagram illustrating a computing system that may be utilized by the network elements described in FIGS. 1, 2, 3 and 4 and for the methods described herein. Computing node 500 includes communication interface 501, processing system 502, and user interface 503. Processing system 502 includes storage system 504. Storage system 504 stores software 505. Processing system 502 is linked to communication interface 501 and user interface 503. Computing node 500 could be comprised of a programmed general-purpose computer, although those skilled in the art will appreciate that programmable or special purpose circuitry and equipment may be used. Computing node 500 may be distributed among multiples devices that together comprise elements 500-505.

Communication interface 501 could comprise a network interface, modem, port, transceiver, or some other communication device. Communication interface 501 may be distributed among multiple communication devices. Processing system 502 could comprise a computer microprocessor, logic circuit, or some other processing device. Processing system 502 may be distributed among multiple processing devices. User interface 503 could comprise a keyboard, mouse, voice recognition interface, microphone and speakers, graphical display, touch screen, or some other type of user device. User interface 503 may be distributed among multiple user devices. Storage system 504 could comprise a disk, tape, integrated circuit, server, or some other memory device. Storage system 504 may be distributed among multiple memory devices.

Processing system 502 retrieves and executes software 505 from storage system 504. Software 505 may comprise an operating system, utilities, drivers, networking software, and other software typically loaded onto a computer system. Software 505 could comprise an application program, firmware, or some other form of machine-readable processing instructions. When executed by processing system 502, software 505 directs processing system 502 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for obtaining a mobile internet protocol (MIP) address, comprising:
receiving, at a service node, a mobile internet node key, wherein the mobile internet node key is generated and transmitted to the service node based on a received data link request;
retrieving, by an authentication node and in response to an MIP access request, the mobile internet node key from the service node;
receiving at a mobile network internet node from the authentication node a MIP access accept message comprising the mobile network internet node key; and
assigning a MIP address to a mobile station at the mobile internet node in response to receiving the MIP access accept message.

2. The method of claim 1, further comprising:
generating the mobile network internet node key at a second authentication node in response to a data link request received from the mobile station.

3. The method of claim 2, further comprising:
providing the generated mobile network internet node key from the second authentication to the service node.

4. The method of claim 1, further comprising:
sending a MIP reply message to a gateway node from the mobile network internet node wherein the MIP reply comprises the MIP address.

5. The method of claim 4, further comprising:
sending a MIP session accept message from the gateway node to the mobile station wherein the MIP session accept message comprises the MIP address.

6. A system for obtaining a mobile internet protocol (MIP) address, comprising:
a service node configured to:
receive a mobile internet node key, wherein the mobile internet node key is generated and transmitted to the service node based on a received data link request;
a first authentication node, configured to:
retrieve, in response to a MIP access request, the mobile internet node key from the service node; and
provide a MIP access accept message comprising a the mobile network internet node key; and
a mobile network internet node, configured to
receive from the authentication node the MIP access accept message; and
assign a MIP address to a mobile station at the mobile internet node in response to receiving the MIP access accept message.

7. The system of claim 6, further comprising:
a second authentication node, configured to generate the mobile network internet node key in response to a data link request received from the mobile station.

8. The method of claim 7, wherein the second authentication node is further configured to provide the generated mobile network internet node key to the service node.

9. The method of claim 6, further comprising:
a gateway node, to receive a MIP reply message,
wherein the mobile network internet node is further configured to send a MIP reply message to the gateway node wherein the MIP reply comprises the MIP address.

10. The method of claim 9, wherein the gateway node is further configured to send a MIP session accept message to the mobile station wherein the MIP session accept message comprises the MIP address.

* * * * *